United States Patent [19]

Voser

[11] 4,438,293

[45] Mar. 20, 1984

[54] CABLE WITH IMPREGNATED FIBER STRENGTH MEMBER FOR NON-SLIP CLAMPING

[75] Inventor: Othmar Voser, Möriken, Switzerland

[73] Assignee: Kupferdraht-Isolierwerk AG Wildegg, Wildegg, Switzerland

[21] Appl. No.: 297,341

[22] Filed: Aug. 28, 1981

Related U.S. Application Data

[62] Division of Ser. No. 186,386, Sep. 11, 1980.

[30] Foreign Application Priority Data

Sep. 18, 1979 [CH] Switzerland ........................ 8444/79

[51] Int. Cl.[3] ........................ H02G 15/06; H02G 7/06

[52] U.S. Cl. ........................................ 174/79; 174/41; 174/70 A; 428/379; 428/383

[58] Field of Search .......................... 174/41, 70 A, 79

[56] References Cited

U.S. PATENT DOCUMENTS

| | | | |
|---|---|---|---|
| 960,291 | 6/1910 | Egner | 174/41 |
| 2,331,840 | 10/1943 | Little | 428/375 |
| 2,348,552 | 5/1944 | Little | 428/375 |
| 2,561,487 | 7/1951 | Bailhe . | |
| 2,819,988 | 1/1958 | Smith . | |
| 3,012,306 | 12/1961 | Tindell | 174/79 |
| 3,018,319 | 1/1962 | Quayle | 174/79 |
| 3,288,913 | 11/1966 | Maddux | 174/79 |
| 3,498,038 | 3/1970 | Shulver . | |
| 3,540,203 | 11/1970 | Thoresen et al. | 174/70 A |
| 3,927,248 | 12/1975 | Scholl et al. | 174/41 |
| 4,202,164 | 5/1980 | Simpson et al. . | |

FOREIGN PATENT DOCUMENTS

| | | | |
|---|---|---|---|
| 1024228 | 1/1978 | Canada | 174/70 A |
| 1106381 | 5/1961 | Fed. Rep. of Germany | 174/70 A |
| 1146346 | 11/1957 | France | 174/70 A |
| 1165974 | 10/1958 | France | 174/79 |
| 293259 | 9/1953 | Switzerland | 174/41 |

OTHER PUBLICATIONS

Brewster; Ray Q., Organic Chemistry; Prentice–Hall, Inc., pp. 777,778.

*Primary Examiner*—A. C. Prescott
*Assistant Examiner*—Morris H. Nimmo
*Attorney, Agent, or Firm*—William J. Daniel

[57] ABSTRACT

The tendency of modern high strength synthetic fibres, e.g., made of aromatic polyamides, when utilized for tension load-carrying purposes in association with an overhead cable arranged parallel thereto within a common protective covering to slip under load out of the clamping members connected thereto before the load reaches its ultimate tensile strength is overcome by impregnating a bundle of such fibres with an impregnating material capable of breaking down into particles when subjected to sufficient compressive stress which is broken down into such particles by the application of the clamping member, the resultant particles exerting within the clamped region a wedging action between the individual fibres and at the exterior of the bundle as a whole upon the application of the tension load to the bundle. Particularly suitable impregnating materials are natural resins, especially colophonium.

14 Claims, 5 Drawing Figures

Fig. 1
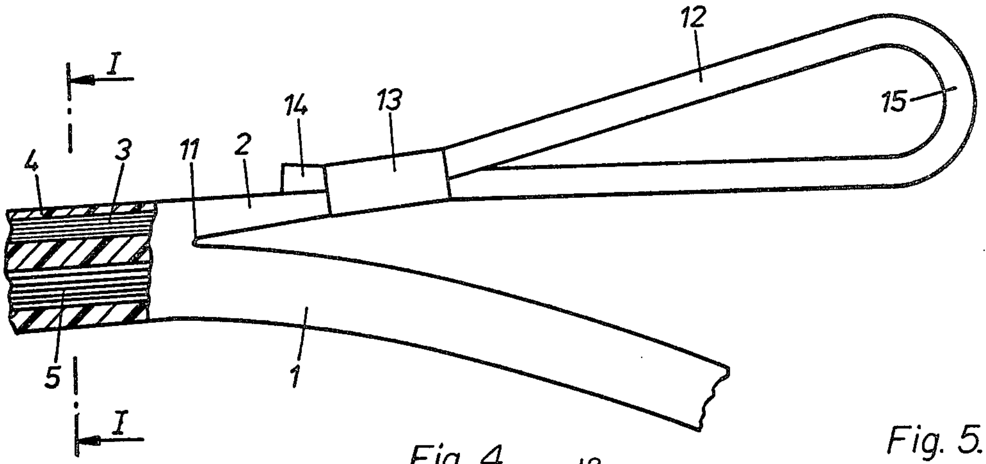
Fig. 4.
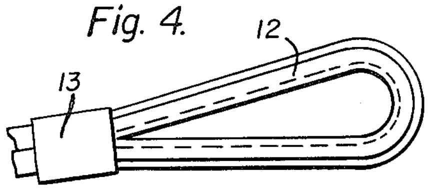
Fig. 5.
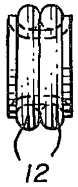
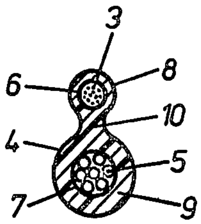
Fig. 2
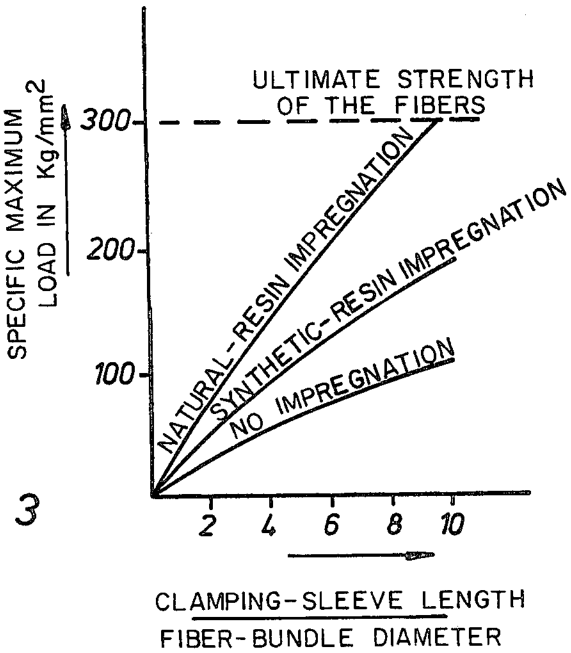
Fig. 3

CABLE WITH IMPREGNATED FIBER STRENGTH MEMBER FOR NON-SLIP CLAMPING

This is a division of Ser. No. 186,386, filed Sept. 11, 1980.

The invention relates to an element for transferring tensile loads, which element comprises a bundle of a plurality of synthetic fibres having smooth surfaces and a tensile strength in excess of 200 $kg/mm^2$, a modulus of elasticity in excess of 3000 $kg/mm^2$, and an elongation at rupture of less than 10%, the fibres, in order to reduce the risk of slip due to their smooth surfaces, being impregnated and bonded, in the area of contact with the force-transfer means, at least over a part of their total length, with a material which unites them and increases the coefficient of friction at the outer surface of the fibres thus bonded.

An element of this kind is known, for example from page 3, Table II Section B of "Kevlar 49, Technical Information, Bulletin No. K-1, June 1974", of the Du Pont de Nemours Company. This relates to a type of cable in which the fibres are not stranded but are arranged parallel with each other and are impregnated with an epoxy resin. After the impregnation, the epoxy resin is hardened by heat-treatment at about 180° C.

However, this known element, which was made purely for experimental purposes, namely to measure the tensile strengths attainable with such elements, is relatively stiff and cannot be used in this form as a hawser, since it breaks relatively easily when bent. The reason for this is that, like most hardenable synthetic resins, epoxy resins break, when hardened, at relatively low flexural stresses. The notch action arising at such breaks leads, within a short time, to consecutive rupture of the fibres bridging the break, from the outside of the element towards the inside.

This element therefore solves the problem of transferring force thereto but not the problem of achieving sufficient flexibility to allow the element to be used in practice as a hawser.

There is also no difficulty in solving the problem of flexibility independent of the problem of transferring force to the element, since all that is necessary to this end is to omit the impregnation of the fibres of the element with the material which bonds them and increases the coefficient of friction at the outer surface of the fibres thus bonded.

However, if the impregnation is omitted, transferring force to the element becomes an extraordinarily difficult problem, since in this case force must be transferred to the individual fibres of the element by static friction between the means enclosing the bundle of fibres and the outer fibres of the bundle and then between the individual fibres. This means that in order to achieve frictional forces corresponding to the high tensile strength of the fibres, extraordinarily high pressure would have to be applied by the force-transfer means—engaging with the outside of the element—to the bundle of fibres, because of the smooth surfaces of the fibres and the low-coefficient of friction thereof. If, for example, it is desired to form, at the end of such an unimpregnated element, a loop around a cable-thimble, by means of a clamping sleeve, a clamping sleeve having a length equal to ten times the diameter of the bundle of fibres would have to exert a pressure of several tons per square centimeter upon the element or bundle of fibres to allow the tensile strength of the element to be fully utilized when it is under tension. With clamping sleeves, however, it is impossible to apply such high pressures, since even a duralumin sleeve, with a wall-thickness equal to half the inside diameter of the sleeve would reach its tensile-strength limit at an internal pressure of five tons per square centimeter, i.e. it would burst when this internal pressure was exceeded, and it should, of course, be clear that, in compressing a clamping sleeve, it is impossible to obtain a clamping pressure which would force the sleeve open when the compression ceases, but that the maximal pressure attainable is far less than the internal pressure required to force the sleeve open. Thus since the necessary pressure of several tons per square centimeter upon the bundle of fibres cannot be achieved with the clamping sleeve, as soon as tension is applied the bundle of fibres slides out of the sleeve before the tensile strength of the fibres is reached, i.e. the tensile strength of an element with unimpregnated fibres is determined, not by the tensile strength of the fibres, but by the maximal pressure applicable to the bundle of fibres by the force-transfer means engaging with the outside of the element, and this is usually far below the tensile strength of the fibres, often only one fifth or one tenth thereof. This, however, eliminates the advantage offered by these synthetic fibres, since hawsers having only one fifth or one tenth of the tensile strength of such fibres may also be made from other materials, with less complex equipment and without the problems produced by the low coefficient of friction of synthetic fibres.

In spite of the intensive efforts in recent years of those engaged in this field, it has hitherto been impossible to produce an element of the type in question, which can be used as a hawser, and satisfactorily involves both the problem of the transfer of force to the element, and the problem of achieving satisfactory flexibility. Although the aforesaid known element solves the force-transfer problem, it fails to solve the flexibility problem. On the other hand, cables known from the same bulletin as this element, and made of synthetic fibres (see page 12, FIG. 117), solve the flexibility problem but, since there is no impregnation, they fail, for the reasons mentioned above, to provide a satisfactory solution of the force-transfer problem. A combination of these two solutions, for example impregnating the synthetic fibres with a material other than that used with the known element, has hitherto not been found.

It was therefore the purpose of the invention to provide an element of the type in question, which may be used as a hawser, which offers satisfactory solutions for both the force-transfer and flexibility problems, and which thus makes it possible to produce, from synthetic fibers, a hawser in which the tensile strength thereof can be fully utilized, thus permitting the transfer of tensile forces substantially greater than those obtained with a steel cable of the same effective cross-section.

According to the invention, and in the case of an element of the type in question, this purpose is achieved by selecting for the material for impregnating the fibres one which breaks down into powder in the area to which the stress is applied, when applied compressive or flexural stress exceeds the ultimate stress limit of the impregnating material.

The use of a material of this kind for impregnating the fibres has two decisive advantages: in the first place, this material completely eliminates any notch-action at locations where it is broken as a result of flexural stressing of the element since, under such circumstances, the material does not break like glass, but decomposes into a powder, particularly in the pressure-area of the bend, thus eliminating the lever-action, which in the case of a glass-like break, leads to successive rupture of the fibres bridging the break, from the outside of the element towards the inside. In the second place, the decomposition of the powder, in areas under very high compressive stress, is of decisive importance since, as indicated above in the example of a clamping sleeve used as the force-transfer means, an extraordinarily high pressure must be applied to the bundle of fibres in force-transfer areas, and the said material therefore breaks down into a powder in such areas. As seen under the microscope, this powder is in the form of small crystals, mainly single crystals, which retain their shape even under very high pressures. Since the bundle of fibres is also impregnated with this material, the crystals produced by disintegration thereof fill the spaces between individual fibres of the bundle almost completely, thus transferring, to each individual fibre, the pressure acting from the outside upon the bundle of fibres. Since the said crystals retain their shape, even under the highest pressures, the edges thereof are forced against the individual fibres. This, however, results in a considerable increase in the coefficient of friction between individual fibres and, since the same naturally applies to the outer fibres of the bundle, it also greatly increases the coefficient of friction between the outside of the bundle and the means enclosing it, the values obtained being substantially higher than would be obtainable with fibres impregnated with a pressure-resistant material. The main reason for this is that pressure-resistant materials form substantially smooth surfaces both on individual fibres and on the outside of the bundle of fibres, whereas the crystals, with their edges pressed against the individual fibres, wedge, as it were, when the fibres are subjected to tension, and the higher the tension, the more strongly are the crystals pressed against the fibres between them.

In the case of the element in question, the said material is preferably a resin which breaks down into a powder under compressive and/or flexural stressing beyond its ultimate-stress limit. Resins having this particular property have hitherto been found only among those consisting completely, or at least mainly, of natural resin, but this does not mean that specific development could not also lead, under certain circumstances, to a synthetic resin possessing this same special pwoperty. However, such breaking down into powder, under the action of pressure, should require, during the forming of the resin, simultaneous production of a plurality of single crystals which subsequently coalesce. This, in turn, requires the presence of crystal nuclei, whereas synthetic resin are usually produced by polymerization and thus have a totally different formation mechanism.

Among natural resins, colophonium, in particular, has the ability to break down into a powder, under the action of pressure to a pronounced degree.

In one preferred form of the present element, therefore, the material used to impregnate the synthetic fibres is colophonium.

The fibres in the present element are preferably made of a synthetic material, preferably an organic polymer, more particularly an aromatic polyamide, as described in the bulletin mentioned hereinbefore, the fibres having a tensile strength of at least 250 kg/mm$^2$, a modulus of elasticity of at least 10000 kg/mm$^2$, and an elongation at rupture of less than 3%

In the present element, the fibres are preferably arranged in the bundle parallel with each other. The advantage of this is that unwanted expansion of the element is largely eliminated, thus restricting to a minimum any sagging, as a result of temperature fluctuations, in the case of horizontally mounted elements. Furthermore, this type of arrangement is the most satisfactory if the element is to be stressed almost to the tensile-strength-limit of the fibres. It also produces the largest effective cross-section and the largest number of fibres for a given diameter of the element or bundle of fibres, and also the maximal load-carrying capacity. Finally, this arrangement of the fibres also provides the highest coefficient of static friction in devices such as clamping sleeves etc. If, however, the very small elongation of the fibres at rupture is too low for a particular application of the element, it is better to improve this by stranding the synthetic fibres.

For the purposes of force-transfer, in the case of at least one of the two end-areas of the element, two regions or sections at different distances from the ends of the bundle are joined together to form a loop, preferably around a circular or thimble-shaped eye, by means of a clamping element, and the impregnation of the fibres extends at least to the region most remote from the end of the fibres. However, the fibres of the element are preferably impregnated with the material over their entire length.

The clamping elements used to form the loops at the ends of the present element preferably comprise at least one clamping sleeve having rounded edges at the locations where the fibres emerge therefrom. The advantage of rounding these edges is that it prevents them from cutting into the bundle of fibres since, within the sleeve, because of the high pressure applied thereby to the bundle of fibres, the cross-section of the latter is somewhat smaller than outside the sleeve where the bundle is not under pressure. The outer fibres of the bundle are therefore bent outwardly around the edge of the sleeve as they emerge therefrom. Since the fibres are tensed when the element is under tension, a sleeve with a sharp edge could cut into the outer fibres. This would cause the outer fibres to break. With the element under very high tension, the resulting reduction in the load-carrying cross section of the bundle of fibres could cause the whole bundle to rupture at this location. This rupturing of outer fibres by sleeves with sharp edges is accelerated in practice by the fact that wind causes a cable mounted out of doors to swing, the nodal point of this swinging being usually located at the transition from one to two cables and thus at end-loop formed by a clamping sleeve, where the cable emerges therefrom. The cable thus bends constantly back and forth at the nodal point.

If the pressure of the clamping sleeve on the bundle of fibres cannot be made high enough to ensure that the end of the bundle will not slip out of the sleeve before the tensile strength of the fibres is reached, then the tensile force, acting upon the end of the bundle of fibres, which causes this to happen when a specific limit-value is exceeded, may be reduced by passing several turns of the end-loop, formed by the clamping sleeve, around a circular eye. This transfers a not inconsiderable part of the overall tension, acting upon the element, directly to the circular eye, and the tension acting upon the clamping sleeve is reduced accordingly. In this connection, the circular eye may, with advantage, be combined with a cable-thimble in such a manner that the parts of the loop between the sleeve and the eye pass through the thimble combined with the eye.

It is desirable to protect the present element against weathering and other external influences by enclosing the fibres in a protective covering, preferably of polyurethane. Especially if the element has strands running parallel with each other, a protective covering this kind is a great advantage, since it also holds the bundle of fibres together. The bundle is, of course, also held together by the impregnating material, if the latter is impregnated over its whole length therewith, but this no longer obtains when the material breaks down into powder at the bend-locations under repeated flexural loads, as in the case of a swinging cable. Under these circumstances, the protective covering still holds the bundle of fibres together at such locations and also counteracts unduly sharp flexing of the element. It also assists in increasing to a maximum the force applied to the bundle at a clamping location, since, if a clamping sleeve is applied, not directly to the bundle, but to the protective covering, then the coefficient of friction which determines the maximal tension that can be transferred, is no longer that between the bundle of fibres and the clamping sleeve, but that between the bundle and the protective covering and, in the case of the present element, the coefficient of friction between the bundle and covering is usually higher than that between the bundle and a clamping sleeve applied directly thereto, since the edges of the crystals constituting the powder, into which the material used to impregnate the fibres breaks down under the action of high pressure within the clamping sleeve, obtain a better hold on the inner surface of the protective covering, when the element is loaded in tension and when, as already explained hereinbefore, the crystals interlock, than on the inner metal surface of the clamping sleeve. However, this assumes that the material of the protective covering is sufficiently strong to withstand the forces transferred by the crystals to the inner surface of the covering, even under high tensile loads. This may easily be achieved, however, by selecting a suitable material for the protective covering.

The invention also relates to the use of the present element as an overhead-cable carrier, in which the element and the cable are enclosed in a common protective covering preferably forming two separate channels for the fibres of the element and the wire of the cable. In this particular application, the present element has decided advantages over steel cables used for the same purpose, since the element has a higher tensile strength and stretches less than a steel cable of the same diameter, and therefore sags less. Furthermore, the danger of the carrier breaking, either due to corrosion in the vicinity of the end loop clamping sleeves, in the case of steel cables, or due to the fibre-bundle slipping out of the end loop clamping sleeves, in the case of unimpregnated cables made of synthetic fibres, is completely eliminated by the use of the present element.

The invention is explained hereinafter in greater detail in conjunction with the exemplary embodiment illustrated in the drawing attached hereto, wherein:

FIG. 1 is a terminal part of an element according to the invention used as a carrier for an overhead cable and combined therewith, commprising and end-loop, secured by a clamping sleeve, for suspending the said overhead cable;

FIG. 2 is a cross-section, in the plane I—I, through the combination illustrated in FIG. 1;

FIG. 3 is a diagram showing the specific load-carrying capacity of one example of an embodiment of the present element, with natural-resin impregnation of the synthetic fibres, as a function of the ratio between the length of the clamping sleeve securing the end-loop and the diameter of the bundle of fibres. For comparison purposes, corresponding curves are shown for an elements of the types mentioned earlier in which the fibres are in one instance impregnated with synthetic resin and in another instance are not impregnated.

FIG. 4 is a detailed view of an element similar to FIG. 1 but modified to incorporate a thimble within the end loop of such element while FIG. 5 is an end view of the element loop of FIG. 4 and showing two turns of the element wound around the thimble.

In the terminal part, illustrated in FIG. 1, of an element 2 used as a carrier for an overhead cable 1, synthetic fibres 3, arranged in strand form running parallel with each other, made of an aromatic polyamide, and having a tensile strength of 300 kg/mm$^2$, a modulus of elasticity of 13400 kg/mm$^2$, an elongation at rupture of 2.6%, and a specific weight of 1.45 g/cm$^3$, are impregnated with colophonium and are enclosed in a protective covering of polyurethane which also encloses wires 5 of the overhead-cable and thus unites the cable and element 2. As may be gathered from the cross-section in FIG. 2, protective covering 4 forms two channels 6,7, isolated from each other, one for fibres 3 of element 2 and one for wires 5 of cable 1. Part 8 of the protective covering, enclosing synthetic fibres 3 is united with part 9, enclosing wires 5 by a bridge 10 integral with the covering. In the terminal length illustrated in FIG. 1, bridge 10 is cut away between element 2 and cable 1 over a length sufficient to allow the loop to be formed. At the end 11 of the cut-away, it is desirable to fit a clip, or the like, not shown in FIG. 1, enclosing the cable and the element, for the purpose of preventing further opening up of bridge 10 beyond edge 11 of the cut. The free end of element 2, formed by cutting away bridge 10, is formed into a loop 12 for suspending the overhead-cable, the loop being secured by clamping sleeve 13. Whereas cut-end 11 is usually substantially greater than is shown in the drawing, the length of the loop is in proportion to the diameter of the element and the cable.

If desired, the end loop 12 of the element 2 can be formed around a thimble or eye shown in FIGS. 4 and 5 and designated 16 and the loop can include more than one turn, e.g. two turns, of the end of the element wound around the thimble 16.

The bundle consisting of fibres 3 has a denier of 106500 corresponding to an effective fibre cross-section of 8.15 mm$^2$. The diameter of the bundle formed by fibres 3, when fully compressed, is about 3.4 mm. The effective cross-section, 8.15 mm$^2$, and the tensile strength, 300 kg/mm$^2$ of the fibres, produce a load limit or ultimate breaking stress for the bundle of fibres of 2445 kg. However, repeated application to the element of a tensile load of 2500 kg neither ruptured the element or the bundle of fibres 3, nor caused end 14 of the said element to slip out of clamping sleeve 13. The length of that sleeve is 75 mm, the outside diameter, after compression, about 8 mm, the compressive load used being 30 tons. Part 8 of the protective covering enclosing fibres 3 has a wall-thickness of about 1 mm and this is reduced by at least one half within the said clamping sleeve. Impregnation of the bundle of fibres is achieved by drawing it, before the protective covering is applied, through a bath of colophonium dissolved in ether, and by then drying and hardening it under heat. Care is taken to ensure that all of the fibres in the bundle are wetted by the colophonium over their entire length, and that any excess solution is removed from the fibres, for example by drawing the bundle out of the bath through a sizing nozzle. Some alcohol may also be used as a solvent for the colophonium, but in this case drying and hardening take rather longer than when ether is used. It is also possible to draw the bundle of fibres through molten colophonium, since the said fibres can easily withstand temperatures above the melting point of colophonium. In this process, however, some problems arise as regards uniform wetting of all fibres in the bundle and removing excess molten colophonium.

Practical tests with the overhead-cable illustrated in FIGS. 1 and 2 have shown that suspending the cable from the present element meets all existing requirements. This applies to tensile strength, weathering, and unusual loads arising when the cable swings in strong wind or ices. In these test s, loops 12 were fitted with cable-thimbles. Inspection carried out on the cable after the tests showed that the colophonium had broken down into powder in the vicinity of cut-end 11, in the areas at each end of clamping sleeve 13 and therewithin, and in the vicinity of bend 15 in loop 12, indicating high compressive and flexural stresses in these areas. However, these areas showed no increase in wear-related phenomena such as rupture of the fibres etc.

FIG. 3 shows, by way of comparison, specific load-carrying capacity as a function of the ratio between clamping-sleeve length and fibre-bundle diameter in respect of the present element, with natural-resin (colophonium) impregnation, synthetic-resin impregnation, and no impregnation of the fibres. It may be gathered from this diagram that, in the case of natural-resin impregnation, as in the case of the present element, and with clamping-sleeve lengths of more than ten times the diameter of the bundle of fibres, the specific load-carrying capacity of the element is a function only of the tensile strength of the bundle of fibres, and that there is no longer any danger of the end of the bundle slipping out of the clamping sleeve. In the case of short clamping sleeves, the bundle of fibres slips out as soon as the specific load on the element exceeds the specific load-carrying capacity indicated by the "natural-resin impregnation" curve at the relevant sleeve length. In this connection, the specific loading of the element is the ratio between the tensile force applied to the loop secured by the clamping sleeve and the effective cross-section of the bundle of fibres corresponding to the sum of the cross-sections of all of the fibres.

Comparison of the "natural-resin impregnation", "synthetic-resin impregnation", and "no impregnation" curves indicates that the average coefficient of friction between the clamping sleeve and the bundle of fibres in the given clamping-sleeve length is about three times as high with natural-resin impregnation as with no impregnation, and about twice as high with synthetic-resin impregnation as with no impregnation of the fibres. Where the clamping-sleeve lengths are more than ten times the diameter of the bundle of fibres, these relationships no longer apply because the curves, as may be seen in FIG. 3, are not linear and, for reasons not yet quite clear, tend, at very long sleeve-lengths, towards a limit-value which is above the ultimate stress limit of the fibres, whereas in the case of synthetic resin impregnation and no impregnation, it is below the ultimate stress limit. This hitherto inadequately explained effect, however, makes complete utilization of the tensile strength of the bundle of fibres impossible with synthetic-resin impregnation and no impregnation of the fibres, since the bundle of fibres slips out of the clamping sleeve, as the load on the element increases, before the tensile strength or ultimate stress limit of the fibres is reached.

The diagram shown in FIG. 3 applies to a constant pressure of the clamping sleeve, regardless of its length, on the bundle of fibres amounting to 18 kg/mm$^2$. At higher pressure-values, which, however, are scarcely attainable with aluminum clamping sleeves, the values appearing in the curves increase as the ratio between the higher pressure value and 18 kg/mm$^2$. At pressure-values of less than 18.2 kg/mm$^2$, the values appearing in the curves decrease as the ratio between the lower pressure-values and 18 kg/mm$^2$.

As may be gathered from FIG. 3, the average coefficients of friction between the clamping sleeve and the bundle of fibres are 0.435 in the case of natural-resin impregnation. 0.28 for synthetic-resin impregnation and 0.15 for no impregnation of the bundle of fibres.

In connection with the diagram in FIG. 3, it should also be mentioned that clamping sleeves having rounded edges where the bundle of fibres emerges therefrom, only the load-carrying length of the sleeve is used in the diagram, i.e. width of the rounded edges is subtracted from the length of the sleeve. In connection with synthetic-resin impregnation it should also be noted that, in spite of the fact that the synthetic-resin impregnation curve in this diagram tends towards a limit-value below the ultimate stress limit of the fibres, in the loading test the bundle of fibres may rupture before slipping out of the clamping sleeve, particularly at the bend in the loop and, in the case of sharp-edged sleeves, where the bundle emerges therefrom. In such cases, however, the specific load at the moment of rupture is below the specific load-carrying capacity or ultimate stress limit of the fibres. The reasons for this are the same as those given earlier in connection with known epoxy-resin impregnation.

In conclusion, it should also be pointed out that in the tensile tests for establishing the diagram of FIG. 3, use was made of fibre-bundles with a denier of 21300, comprising fibres arranged in strands running parallel with each other, made of an aromatic polyamide, and having a tensile strength of 300 kg/mm$^2$, a modulus of elasticity of 13400 kg/mm$^2$, and elongation at rupture of 2.6%, and a specific weight of 1.45 g/cm$^3$; that the diameter of the compressed fibre-bundle was about 1.5 mm, and the effective cross-section of the bundle was about 1.65 mm$^2$; and that each of the fibre-bundles used had a loop at each end secured by a clamping sleeve, and had no covering.

I claim:

1. A composite cable comprising a tensile load carrier element, an overhead cable, a common protective covering enclosing said carrier element and said overhead cable and uniting the same, and connecting means transferring a tensile load to said carrier element, said covering comprising two channels, one for said carrier element and one for said overhead cable, said carrier element comprising a bundle of synthetic fibres having smooth surfaces and a tensile strength in excess of 200 kg/mm$^2$, a modulus of elasticity in excess of 3000 kg/mm$^2$, and an elongation at rupture of less than 10%, said fibres, in order to reduce the risk of slippage in connecting regions of said carrier element due to their smooth surfaces, being impregnated at least over at least the connecting regions thereof, with a material uniting the fibres of the element and, when subjected to compressive and/or bonding stress exceeding its ultimate strength for such stress, breaking down into a powder within the stressed areas and being broken down into a powder within the connecting regions thereby causing within such regions a wedging action both between the individual fibres of the bundle as well as at the exterior surface of the bundle as a whole.

2. A cable according to claim 1, wherein said two channels are isolated from each other.

3. A cable according to claim 1 or 2, wherein said impregnating material is a resin.

4. A cable according to claim 3, wherein said resin is composed at least mainly of natural resin.

5. A cable according to claim 4, wherein said natural resin is colophonium.

6. A cable according to claim 1, wherein said synthetic fibers are composed of an organic polymer.

7. A cable according to claim 6, wherein said organic polymer is an aromatic polyamide and wherein said fibres have a tensile strength of at least 250 kg/mm$^2$, a modulus of elasticity of at least 10000 kg/mm$^2$, and an elongation at rupture of less than 3%.

8. A cable according to one of the claims 1–7, wherein said synthetic fibres are arranged in a strand-like form in parallel with each other.

9. A cable according to one of the claims 1–7, wherein said synthetic fibres are stranded.

10. A cable according to one of the claims 1 to 9, wherein at each of the ends of the cable, two lengthwise spaced apart sections of the carrier element are secured together by means of a clamping element so as to form a closed end-loop and the impregnating material extends at least beyond the length of each such end-loop.

11. A cable according to claim 10, wherein said end-loop encircles a circular eye or thimble.

12. A cable according to claim 10, wherein said end-loop encircles a circular eye and is wound several turns around said eye.

13. A cable according to one of the claims 10 to 12, wherein said clamping member comprises at least one clamping sleeve with rounded end edges.

14. A cable according to one of the claims 1–13, wherein said protective covering is made of polyurethane.

* * * * *